US010518659B2

(12) United States Patent
Haynes et al.

(10) Patent No.: US 10,518,659 B2
(45) Date of Patent: Dec. 31, 2019

(54) SUPPORT STRUCTURE FOR WIRELESS CHARGING PAD

(71) Applicant: Honda Motor Co., Ltd., Tokyo (JP)

(72) Inventors: Holly A. Haynes, Dublin, OH (US); Christopher Lang, Delaware, OH (US); Hiroyasu Takizawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 15/786,674

(22) Filed: Oct. 18, 2017

(65) Prior Publication Data

US 2019/0111792 A1    Apr. 18, 2019

(51) Int. Cl.
| | | |
|---|---|---|
| *H02J 7/00* | (2006.01) | |
| *B60L 53/22* | (2019.01) | |
| *H02J 50/10* | (2016.01) | |
| *H02J 7/02* | (2016.01) | |
| *B60L 53/12* | (2019.01) | |

(52) U.S. Cl.
CPC ............... *B60L 53/22* (2019.02); *B60L 53/12* (2019.02); *H02J 7/025* (2013.01); *H02J 50/10* (2016.02)

(58) Field of Classification Search
CPC ..... B60L 11/182; B60L 11/1812; H02J 5/005; H02J 50/10; H02J 53/00; H02J 53/22; H02J 53/30; H02J 7/0027
USPC ......................................................... 320/109
See application file for complete search history.

(56) References Cited

U.S. PATENT DOCUMENTS

| | | | |
|---|---|---|---|
| 4,090,721 A | 5/1978 | Wedin et al. | |
| 4,093,254 A | 6/1978 | Ezaki | |
| 8,028,781 B2 | 10/2011 | Fausch et al. | |
| 9,114,837 B2 | 8/2015 | Clapie et al. | |
| 9,120,506 B2 | 9/2015 | Isakiewitsch et al. | |
| 9,211,917 B1 | 12/2015 | Baccouche et al. | |
| 2016/0176299 A1* | 6/2016 | Kautz | B60L 11/182 307/9.1 |

FOREIGN PATENT DOCUMENTS

| | | |
|---|---|---|
| CN | 103608244 | 2/2014 |
| CN | 103847795 | 6/2014 |
| CN | 204978868 | 1/2016 |
| CN | 105599581 | 5/2016 |
| JP | 2012257446 | 12/2012 |
| WO | 2012157661 | 11/2012 |

OTHER PUBLICATIONS

"Auto Transmission and Oil Pan Armor Installation" http://www.wranglerforum.com/f202/2012-jk-auto-transm-and-oil-pan-armor-installation-1942162.html (Accessed Jul. 24, 2017).

* cited by examiner

*Primary Examiner* — Paul Dinh
(74) *Attorney, Agent, or Firm* — Honda Patent & Technologies North America, LLC; Mark E. Duell

(57) ABSTRACT

An electrified vehicle includes a frame with first and second longitudinal members and first and second transverse members, and a front subframe located forwardly of the frame. A wireless charging pad is located rearwardly of the front subframe between the longitudinal and transverse members of the frame. A support structure for preventing damage to the wireless charging pad includes first and second structural support members extending along opposite sides of the wireless charging pad, and a transverse structural support member extending between the first and second structural support members.

9 Claims, 4 Drawing Sheets

VIEW A-A

VIEW B-B

SUPPORT STRUCTURE FOR WIRELESS CHARGING PAD

TECHNICAL FIELD

The embodiments described herein relate to the field of support structures, and more specifically to a support structure for a wireless charging pad.

BACKGROUND

Wireless charging will be increasingly used with electrified vehicle powertrains, including electric-gasoline hybrids and electric vehicles, to charge the high voltage batteries of the electrified vehicles without plugging them into an outlet or charging station with a cord. A primary wireless charging pad on the ground under the electrified vehicle emits electromagnetic waves that are received by a secondary pad mounted on the underside of the electrified vehicle. The secondary pad converts the electromagnetic energy into current, which in turn is used to charge the high voltage battery. The wireless charging technology is expected to meet the wireless charging standard and recommended practices published by the Society of Automotive Engineers (SAE) International as SAE J2954, which establishes an industry-wide specification guideline that defines acceptable criteria for interoperability, electromagnetic compatibility, minimum performance, safety and testing for wireless charging of light duty electric and plug-in electric vehicles.

There is a need to mount a wireless pad on an underside of the electrified vehicle. If the wireless pad is positioned behind the front subframe, it could be damaged if a vehicle drives off a high curb and scrapes the undercarriage. Therefore, there is further established a need to protect the wireless pad mounted behind the front subframe of the electrified vehicle.

APPLICATION SUMMARY

According to one aspect, an electrified vehicle includes a frame that further includes a first longitudinal frame member extending longitudinally along a first side of the electrified vehicle, a second longitudinal frame member extending longitudinally along a second side of the electrified vehicle parallel to the first longitudinal member, a first transverse frame member extending between the first longitudinal frame member and the second longitudinal frame member, and a second transverse frame member extending between the first longitudinal frame member and the second longitudinal frame member. A front subframe member extends longitudinally forward from the first longitudinal frame member and the second longitudinal frame member. A wireless charging pad is located longitudinally rearward of the front subframe and between the first and second longitudinal frame members and between the first and second transverse frame members. A support structure for protecting the wireless charging pad includes a first structural support member extending longitudinally along a first side of the wireless charging pad, a second structural support member extending longitudinally along a second side of the wireless charging pad, and a transverse structural support member, extending between the first structural support member and the second structural support member.

According to another aspect, a charging system for an electrified motor vehicle, the motor vehicle having including a frame having a first longitudinal frame member extending longitudinally along a first side of the electrified vehicle, a second longitudinal frame member extending longitudinally along a second side of the electrified vehicle parallel to the first longitudinal member, a first transverse frame member extending between the first longitudinal frame member and the second longitudinal frame member, and a second transverse frame member extending between the first longitudinal frame member and the second longitudinal frame member, and a front subframe member extending longitudinally forward from the first longitudinal frame member and the second longitudinal frame member, includes a wireless charging pad located longitudinally rearward of the front subframe and between the first and second longitudinal frame members and between the first and second transverse frame members and a support structure for protecting the wireless charging pad. The support structure includes a first structural support member extending longitudinally along a first side of the wireless charging pad, a second structural support member extending longitudinally along a second side of the wireless charging pad, and a transverse structural support member, extending between the first structural support member and the second structural support member.

According to yet another aspect, a support structure for protecting a wireless charging pad for an electrified vehicle, the wireless charging pad located beneath the frame of the electrified vehicle, includes a first structural support member extending longitudinally along a first side of the wireless charging pad, a second structural support member extending longitudinally along a second side of the wireless charging pad, and a transverse structural support member, extending between the first structural support member and the second structural support member.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The FIGS. depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
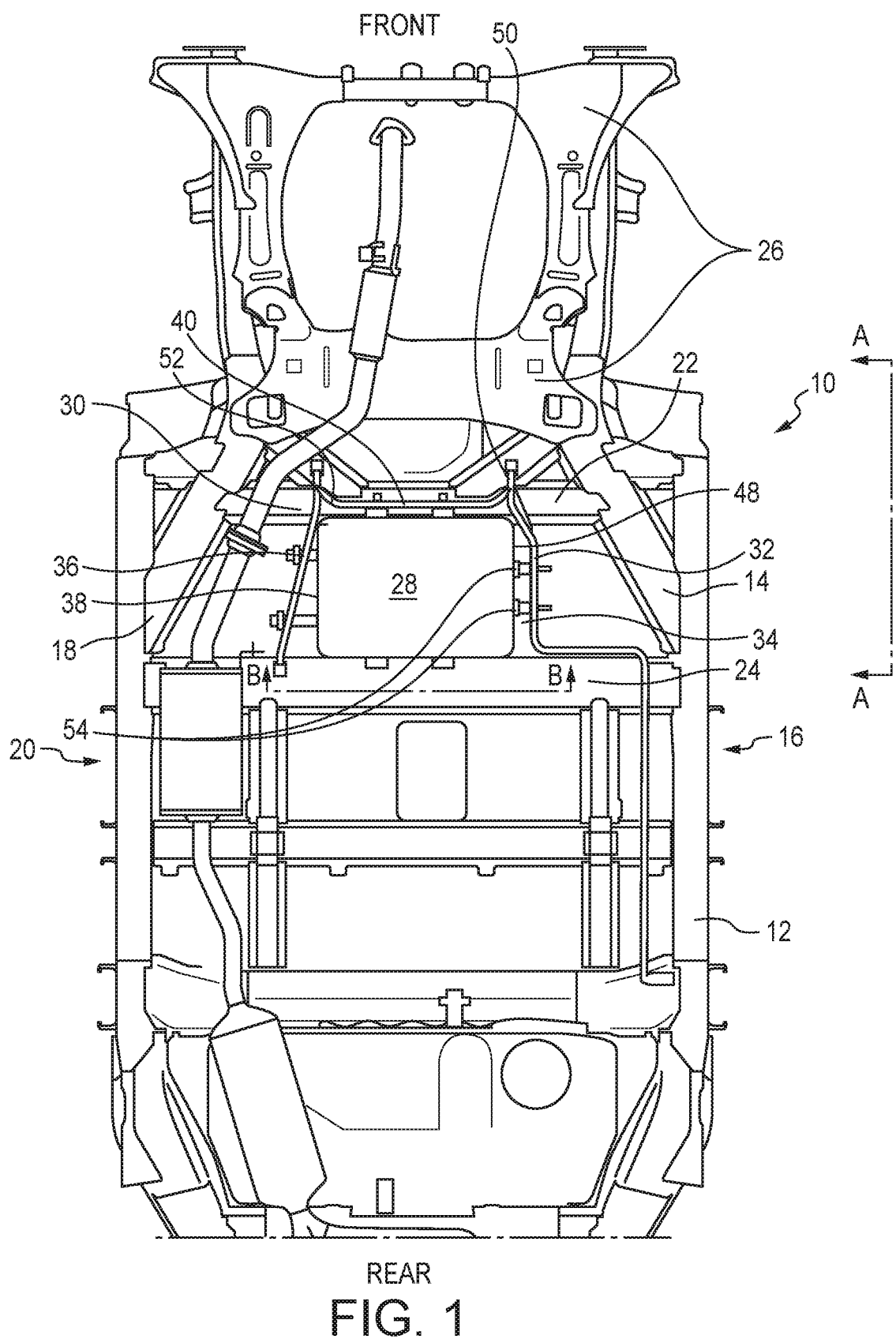
FIG. 1 is bottom view of a frame of an electrified vehicle.

FIG. 1 is a view of a portion of the bottom of an electrified vehicle 10. The electrified vehicle 10 may include a frame 12 that includes a first longitudinal frame member 14 extending generally longitudinally along a first side 16 of the electrified vehicle 10 and a second longitudinal frame member 18 extending generally longitudinally along a second side 20 of the electrified vehicle 10. A first transverse frame member 22 extends between the first longitudinal frame member 14 and the second longitudinal frame member 18. A second transverse frame member 24 extends between the first longitudinal frame member 14 and the second longitudinal frame member 18.

Located longitudinally forward of the frame 12 is a front subframe 26, which extends longitudinally forward from the first longitudinal frame member 14 and the second longitudinal frame member 18.

The electrified vehicle 10 also includes a wireless charging pad 28 located longitudinally rearward of the front subframe 26, between the first and second longitudinal frame members 14, 18, and between the first and second transverse frame members 22, 24. The wireless charging pad 28 is configured to be located above an induction charger (not shown) installed in the floor of a parking location of the electrified vehicle 10, which may typically be a garage. The induction charger on the ground under the electrified vehicle 10 emits electromagnetic waves that are received by the wireless charging pad 28 mounted under the electrified vehicle 10. The electromagnetic waves induce an electrical current in the wireless charging pad 28, which in turn is used to charge a high voltage battery (not shown) in the electrified vehicle 10 in a method known to those skilled in the art.

Figure 2:
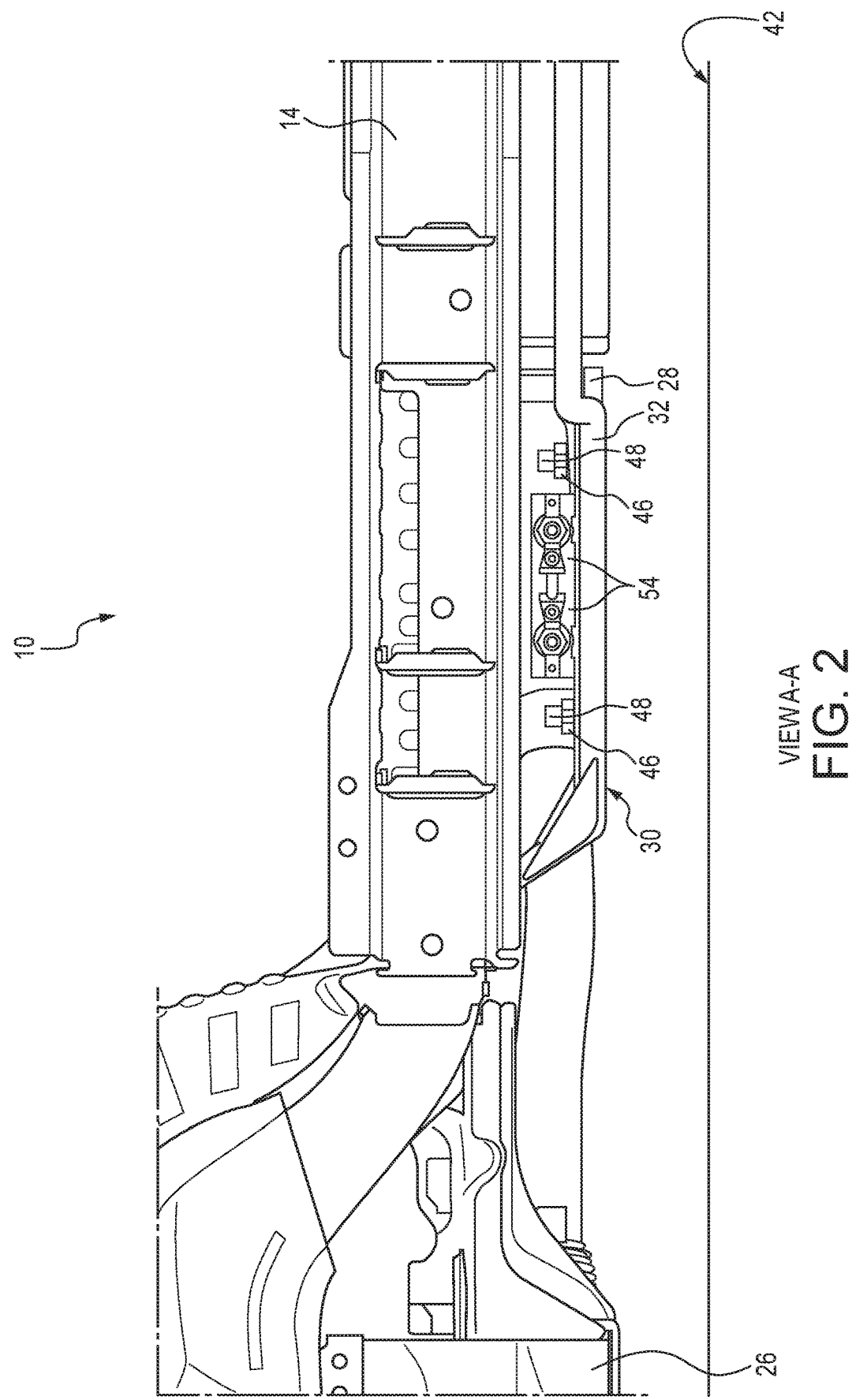
FIG. 2 is a side view of a portion of the frame of the electrified vehicle viewed from line A-A of FIG. 1.
Figure 3:
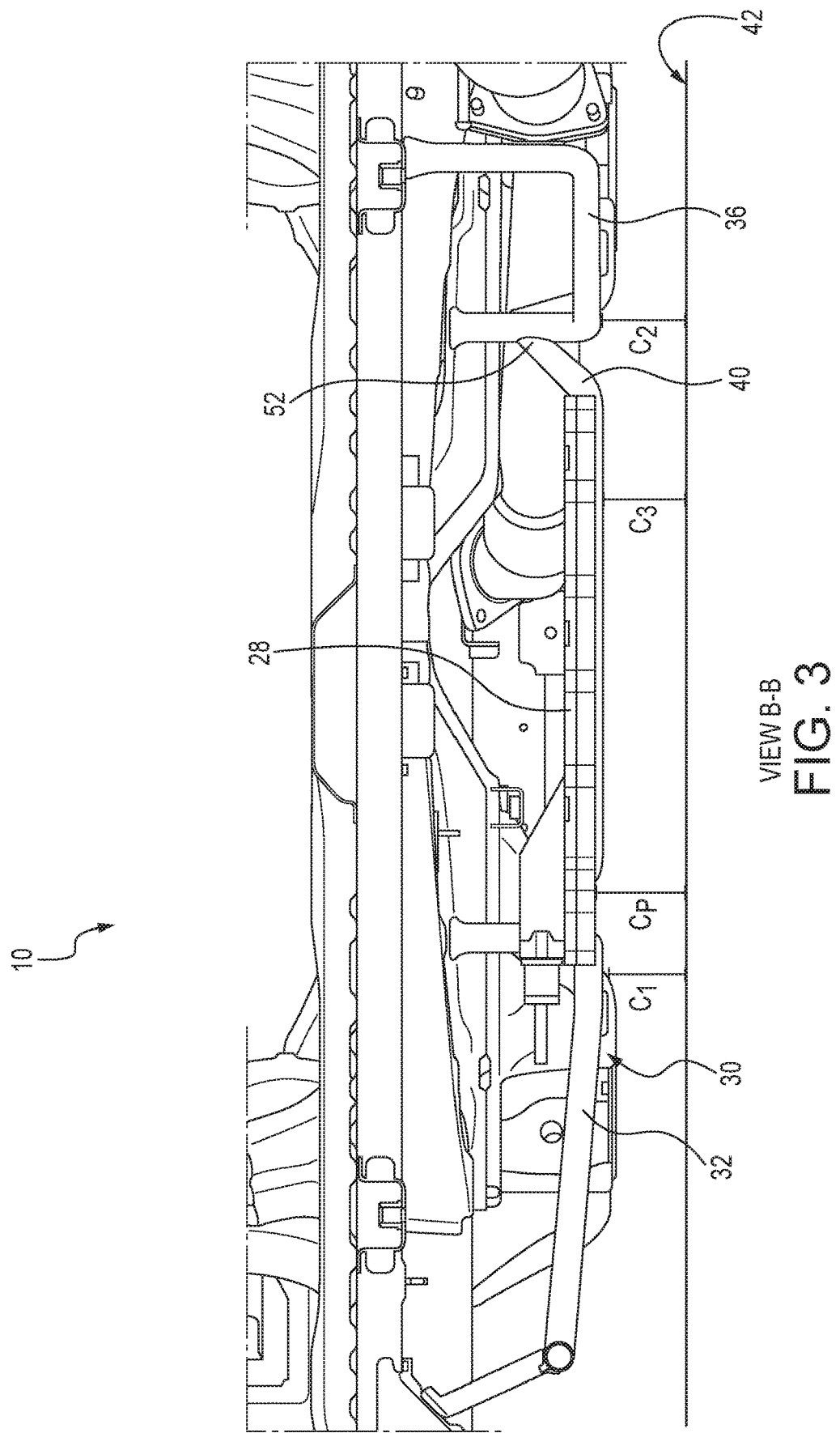
FIG. 3 is a rear view of a portion of the frame of the electrified vehicle viewed from line B-B of FIG. 1.

As illustrated in FIGS. 1-3, a support structure 30 is provided for preventing damage to the wireless charging pad 28. The support structure 30 may include a first structural support member 32 extending longitudinally along a first side 34 of the wireless charging pad 28, a second structural support member 36 extending longitudinally along a second side 38 of the wireless charging pad 28, and a transverse structural support member 40, extending between the first structural support member 32 and the second structural support member 36. The support members 32, 36, 40 may consist of tubes or pipes, constructed of stainless steel or any other suitably rigid material, and connected together by any suitable method, such as by welding, nuts and bolts or any other suitable fasteners, or the support members 32, 36, 40 may be integrally formed, to form the support structure 30. The support structure 30 may further be connected to the frame 12 by any suitable method, such as by welding, nuts and bolts or any other suitable fasteners.

In the embodiment illustrated in FIG. 1, the transverse structural support member 40 extends between the first structural support member 32 and the second structural support member 36 longitudinally forward of the wireless charging pad 28.

Figure 4:
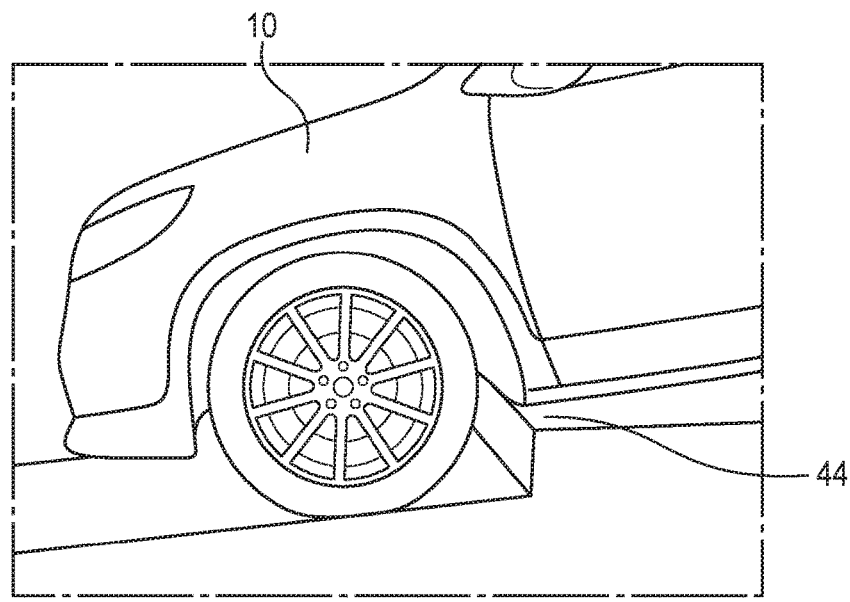
FIG. 4 is a side view of an electrified vehicle traversing over a curb.
Figure 5:
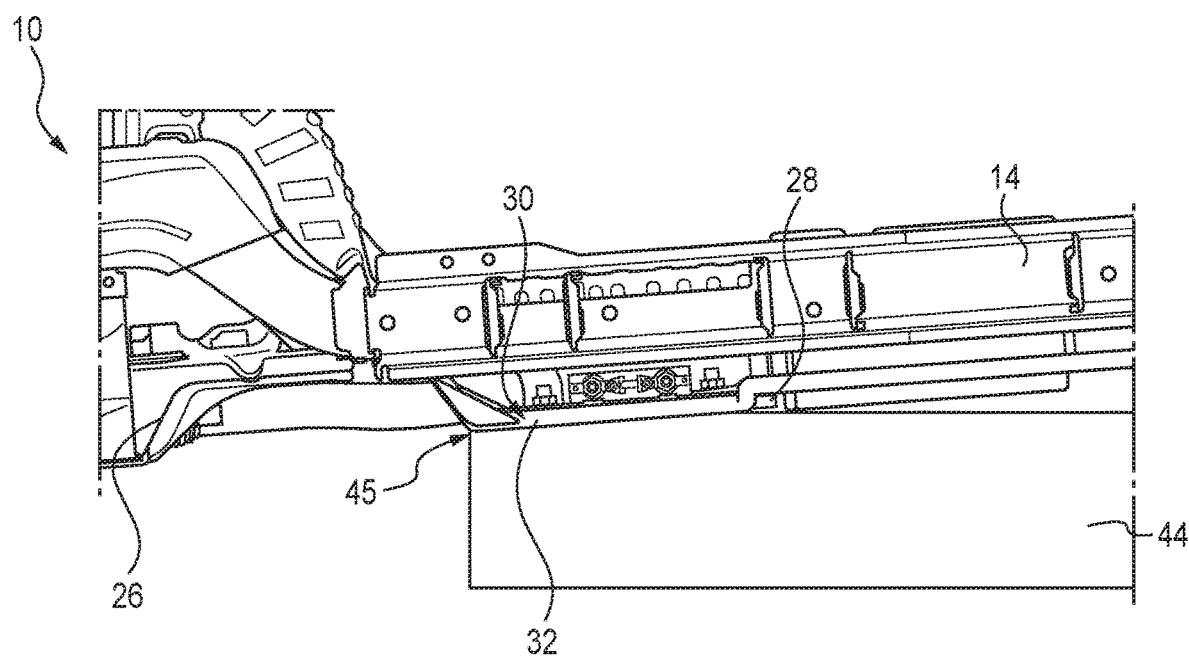
FIG. 5 is the side view of the portion of the frame of the electrified vehicle viewed from line A-A of FIG. 1 as the electrified vehicle traverses the curb as illustrated in FIG. 4.

As illustrated in FIG. 3, the first structural support member 32 is positioned vertically lower than the wireless charging pad 28 in order to protect the wireless charging pad 28. More specifically, the first structural support member 32 has a first clearance $c_1$ above a flat surface 42, such as the road or a driveway, on which the electrified vehicle 10 sits. The wireless charging pad 28 has a pad clearance $c_p$ above the flat surface 42, and the first clearance $c_1$ is less than the pad clearance $c_p$. Therefore, as the electrified vehicle 10 drives over a curb 44, or any other obstruction, as illustrated in FIGS. 4-5, the edge 45 of the curb 44 engages the first structural support member 32, which has a lower first clearance $c_1$ over the edge 44 of the curb 44 than the pad clearance $c_p$ of the wireless charging pad 28, thereby preventing damage to the wireless charging pad 28 as the electrified vehicle 10 moves over the curb 44.

Additionally, the second structural support member 36 has a second clearance $c_2$ above the flat surface 42 on which the electrified vehicle 10 sits, and the second clearance $c_2$ is also less than the pad clearance $c_p$ of the wireless charging pad 28. In one embodiment, the first clearance $c_1$ is equal or substantially equal to the second clearance $c_2$, although equality is not a requirement for operation of the support structure 30.

Further, the transverse structural support member 40 has a third clearance $c_3$ above the flat surface 42 on which the electrified vehicle 10 sits, and the third clearance $c_3$ is less than the pad clearance $c_p$ of the wireless charging pad 28. In one embodiment, the third clearance $c_3$ is equal or substantially equal to the first clearance $c_1$ and to the second clearance $c_2$, although equality is not a requirement for operation of the support structure 30.

As illustrated in FIGS. 1-2 the wireless charging pad 28 may be attached to the first structural support member 32, either permanently by welding, or, as illustrated in FIG. 2, removable with nuts 46 and bolts 48, or by any other suitable fasteners.

As illustrated in FIG. 1, which illustrates a typical arrangement of the support structure 30, first structural support member 32 is attached to a first end 50 of the transverse structural member 40 and the second structural support member 36 is attached to a second end 52 of the transverse structural member 40.

As additionally illustrated in FIG. 1, the first structural support member 32, may be extended rearwardly along the first longitudinal frame member 14 to protect the batteries (not shown). Alternatively, the first structural support member 32 may be separated into multiple sections for easier construction and assembly. Also, even though not shown in FIG. 1, in an alternate embodiment, the second structural support member 36 may also or separately be extended rearward along the second longitudinal frame member 18.

FIGS. 1-2 additionally illustrate terminals 54 on the side of the wireless charging pad. The terminals 54 may be the connection point for wires (not shown) connecting the wireless charging pad 28 to the batteries (not shown).

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A charging system for an electrified motor vehicle, the motor vehicle having comprising a frame, having a first longitudinal frame member extending along a first side of the electrified vehicle, a second longitudinal frame member extending along a second side of the electrified vehicle, a first transverse frame member extending between the first longitudinal frame member and the second longitudinal frame member, and a second transverse frame member extending between the first longitudinal frame member and the second longitudinal frame member, and a front subframe member extending longitudinally forward from the first longitudinal frame member and the second longitudinal frame member, comprising:
- a wireless charging pad located longitudinally rearward of the front subframe and between the first and second longitudinal frame members and between the first and second transverse frame members; and
- a support structure for protecting the wireless charging pad, comprising:
  - a first structural support member extending longitudinally along a first side of the wireless charging pad;
  - a second structural support member extending longitudinally along a second side of the wireless charging pad; and
  - a transverse structural support member, extending between the first structural support member and the second structural support member.

2. The charging system of claim 1 wherein the transverse structural support member extends between the first structural support member and the second structural support member longitudinally forward of the wireless charging pad.

3. The charging system of claim 2 wherein the first structural support member has a first clearance above a flat surface on which the electrified vehicle sits and the wireless charging pad has a pad clearance above the flat surface, and wherein the first clearance is less than the pad clearance.

4. The charging system of claim 3 wherein the second structural support member has a second clearance above the flat surface on which the electrified vehicle sits, and wherein the second clearance is less than the pad clearance.

5. The charging system of claim 4 wherein the wireless charging pad is attached to the first structural support member.

6. The charging system of claim 4 wherein the transverse structural support member has a third clearance above the flat surface on which the electrified vehicle sits, and wherein the third clearance is less than the pad clearance.

7. The charging system of claim 6 wherein the first structural support member, the second structural support member, and the transverse structural support member are tubular metallic pipes.

8. The charging system of claim 7 wherein the first structural support member is attached to a first end of the transverse structural member and the second structural support member is attached to a second end of the transverse structural member.

9. The charging system of claim 8 wherein the first structural support member is welded to a first end of the transverse structural member and the second structural support member is welded to a second end of the transverse structural member.

* * * * *